United States Patent
Torruellas et al.

(10) Patent No.: US 10,295,658 B2
(45) Date of Patent: May 21, 2019

(54) OPTICAL DETECTION SYSTEM

(71) Applicant: The Johns Hopkins University, Baltimore, MD (US)

(72) Inventors: William E. Torruellas, Ellicott City, MD (US); Robert L. Fry, New Windsor, MD (US); Isaac N. Bankman, Clarksville, MD (US); David M. Brown, Ellicott City, MD (US); Gil Tadmor, Rockville, MD (US); Thomas Raphael Clark, Jr., Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 855 days.

(21) Appl. No.: 14/872,175

(22) Filed: Oct. 1, 2015

(65) Prior Publication Data

US 2018/0081032 A1   Mar. 22, 2018

Related U.S. Application Data

(60) Provisional application No. 62/058,693, filed on Oct. 2, 2014, provisional application No. 62/105,767, filed on Jan. 21, 2015.

(51) Int. Cl.

| *G01C 3/08* | (2006.01) |
|---|---|
| *G01S 7/484* | (2006.01) |
| *G01S 17/08* | (2006.01) |
| *G01S 17/93* | (2006.01) |
| *G01S 7/481* | (2006.01) |
| *G01S 7/48* | (2006.01) |
| *G01S 17/10* | (2006.01) |
| *G01S 17/42* | (2006.01) |

(52) U.S. Cl.
CPC ............ *G01S 7/484* (2013.01); *G01S 7/4808* (2013.01); *G01S 7/4815* (2013.01); *G01S 17/08* (2013.01); *G01S 17/10* (2013.01); *G01S 17/42* (2013.01); *G01S 17/936* (2013.01)

(58) Field of Classification Search
CPC ...... G01S 7/484; G01S 7/4808; G01S 7/4815; G01S 17/08; G01S 17/936
See application file for complete search history.

(56) References Cited

U.S. PATENT DOCUMENTS

| 4,651,647 A | 3/1987 | Baker |
| 5,005,480 A | 4/1991 | Szewczyk |
| 5,463,384 A | 10/1995 | Juds |
| 6,072,421 A | 6/2000 | Fukae et al. |
| 6,219,596 B1 | 4/2001 | Fukae et al. |
| 7,049,945 B2 | 5/2006 | Breed et al. |
| 7,319,777 B2 | 1/2008 | Morcom |
| 7,533,849 B2 | 5/2009 | Zemany et al. |

(Continued)

FOREIGN PATENT DOCUMENTS

| DE | 4006678 | 5/1996 |
| GB | 2320316 | 6/1998 |

*Primary Examiner* — Samantha K Abraham
(74) *Attorney, Agent, or Firm* — Noah J. Hayward (57) ABSTRACT

An active optical detection system includes an optical transmitter configured to transmit light in a signal pattern and an optical receiver configured to receive light and determine a correlation between the received light and the signal pattern. The correlation of the received light and the signal pattern is indicative of range to an object.

17 Claims, 9 Drawing Sheets

(56) References Cited

U.S. PATENT DOCUMENTS

| | | |
|---|---|---|
| 7,579,593 B2 | 8/2009 | Onozawa et al. |
| 7,630,806 B2 | 12/2009 | Breed |
| 7,983,817 B2 | 7/2011 | Breed |
| 8,760,634 B2 | 6/2014 | Rose |
| 8,842,182 B2 | 9/2014 | Mimeault et al. |
| 2008/0294315 A1* | 11/2008 | Breed .................. B60N 2/002 701/49 |
| 2011/0058153 A1* | 3/2011 | Van Nieuwenhove ...................... G01S 17/08 356/5.01 |
| 2011/0185935 A1 | 8/2011 | Jennings et al. |
| 2012/0211591 A1 | 8/2012 | Sandomirsky et al. |
| 2013/0050676 A1* | 2/2013 | d'Aligny ................ G01S 17/10 356/5.01 |
| 2013/0202290 A1* | 8/2013 | Dvir .................... H04B 10/071 398/21 |

\* cited by examiner

OPTICAL DETECTION SYSTEM

CROSS REFERENCE TO RELATED APPLICATIONS

This application claims priority to and the benefit of prior-filed, co-pending U.S. Provisional Application Ser. Nos. 62/058,693 and 62/105,767, filed on Oct. 2, 2014 and Jan. 21, 2015, respectively, the entire contents of which are hereby incorporated herein by reference.

STATEMENT OF GOVERNMENTAL INTEREST

This invention was made with Government support under contract number N00024-03-D-6606 awarded by the Naval Sea Systems Command (NAVSEA). The Government has certain rights in the invention.

TECHNICAL FIELD

Example embodiments generally relate to proximity detectors and, in particular, relate to an active optical detection system.

BACKGROUND

Typical active optical detection systems, such as a laser range finder, may transmit a light pulse and receive a reflection of the light pulse in response. The active optical detector may determine a range to an object, e.g. the source of the reflection, based on the time of flight of the light pulse. The time of flight may be measured as the elapsed time from the transmission of the light pulse to the receipt of the reflection the light pulse. The range or distance may be calculated by dividing the time of flight by two times the speed of light. The range determinations may be used for proximity detection and, in an instance in which two or more light pulses have been received, for determination of object velocity. Some active optical detectors may be susceptible to confusion, e.g. erroneous results, from soft objects, such as rain, snow, fog, dust, smoke, or the like. The light pulse may be reflected by the soft objects, causing erroneous range measurements. Although, some active optical detectors may provide accurate range measurements, they cannot determine a direction of the object in relation to the active optical detector.

In some cases active optical detectors using a laser may have a high peak power which may limit the achievable accuracy of the active optical detector without exceeding power limits, such as determined by eye-safety standards. In an instance in which the pulse transmission is 1 ns the accuracy of the typical active optical detector may be about 1 ft. The typical active optical detector may also be limited to laser light sources, such as high power lasers, which do not dissipate over a short range, may be tuned to a specific wavelength for detection, or the like. These high powered lasers may be expensive and, in some instances, dangerous to the human eye.

BRIEF SUMMARY OF SOME EXAMPLES

Accordingly, some example embodiments may enable the provision of an active optical detection system, as described below. In one example embodiment, an active optical detection system is provided including an optical transmitter configured to transmit light in a signal pattern and an optical receiver configured to receive light and determine a correlation between the received light and the signal pattern. A correlation of the received light and the signal pattern is indicative of a range to an object.

In another example embodiment, a method is provided including transmitting light in a signal pattern, receiving light at an active optical detection system, determining a correlation between the received light and the signal pattern, and determining, by the active optical detection system, a range to an object based on the correlation between the received light and the signal pattern.

BRIEF DESCRIPTION OF THE SEVERAL VIEWS OF THE DRAWING(S)

Having thus described the active optical detection system in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not necessarily all example embodiments are shown. Indeed, the examples described and pictured herein should not be as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

In an example embodiment, an active optical detection system may transmit light in a signal pattern. The active optical detection system may receive reflected light from one or more object surfaces and compare the received light to the signal pattern. Correlations between the received light and the signal pattern may be indicative of the range of the object which reflected the light. Range determinations may be highly accurate, e.g. on the order of millimeters to centimeters. In one example, the accuracy at a 1 ns bandwidth is about 1 cm. Further, the range determinations may not be effected by soft object reflections, since the reflections of soft objects, e.g. smoke, fog, rain, dust, snow, or the like, may reflect only a portion of signal pattern, resulting in low or no correlation. The angle or location is determined by the specific pattern sent at the angle or location of the laser transmitter.

In an example embodiment, the active optical detection system may include a plurality of light sources, each aligned to a different transmission angle or location. Further, the respective light sources may also have a unique wavelength and/or signal pattern. The active optical detection system may determine the direction of the object based on the transmission angle associated with the wavelength and/or pattern of the received light which correlates to the signal pattern. In some instances, the direction may be associated with the range to determine a relative or proximate location of the object in reference to the active optical detection system.

In some embodiments, the active optical detection system may include an aperture head with apertures aligned to different reception angles and a segmented photo detector or a plurality of photo detectors. The active optical detection system may determine a direction of the object based on the segment of the photo detector or the photo detector of the plurality of photo detectors which received the received light correlated to the signal pattern, indicative of the associated reception angle.

In an example embodiment, the active optical detection system may also determine a velocity of an object based on two or more correlations of received light and signal patterns. The active optical detection system may compare the a first correlation time and range to a second correlation time and range, the change in range and time from the first correlation to the second correlation may be indicative of a velocity.

The active optical detection system may be deployed in a variety of applications including, but not limited to proximity detection and/or proximate location determination on vehicles, proximity warnings, targeting, fuse triggering, or the like.

In an example embodiment, the light source may be a significantly less powerful and less expensive than typical active optical detectors, such as lower power lasers, light emitting diodes (LEDs), or the like.

Example Deployment of an Active Optical Detection System

Figure 1:
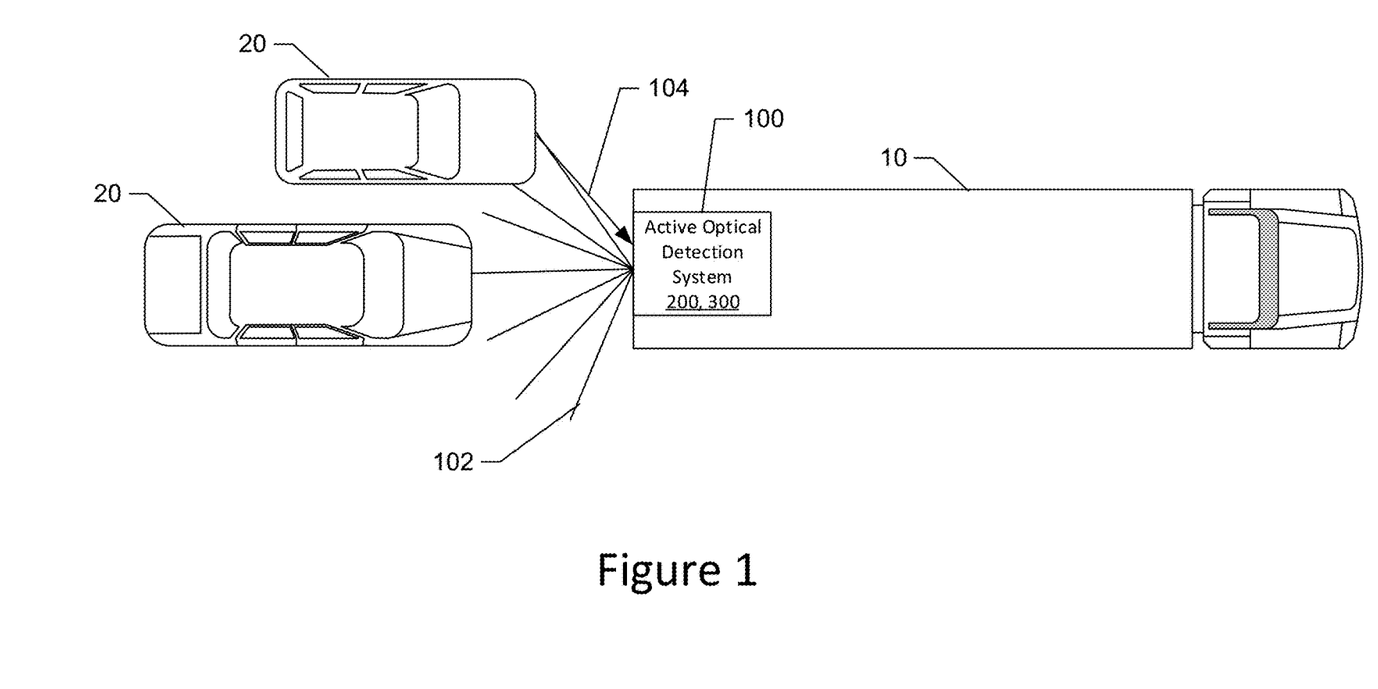
FIG. 1 illustrates an active optical detection system deployed on a vehicle according to an example embodiment.

FIG. 1 illustrates an active optical detection system 100 deployed on a vehicle 10, such as a tractor trailer, bicycle, motor-cycle, or the like according to an example embodiment. The active optical detection system 100 may include an optical transmitter 200, as discussed in reference to FIG. 2 below, and an optical receiver 300, as discussed in reference to FIG. 3 below. In this example, the active optical detection system 100 may transmit light 102 in a signal pattern. The signal pattern may be a series of light pulses in a predetermined pattern. The transmitted light 102 may be reflected off of an object 20, such as a car in the current example. The reflected light 104 may be compared to the signal pattern of the transmitted light 102 to determine correlation. A correlation between light received by the active optical detection system 100 and the signal pattern of the transmitted light may be indicative of reflected light 104 off an object 20. The active optical detection system 100 may determine a time of transmission (TOT) of the transmitted light 102 and a time at which the reflected light 104 which correlated with the signal pattern is received, e.g. time of arrival (TOA). The difference between the time of transmission and time of arrival may be a "time of flight" (TOF). The TOF may be divided by 2 and the speed of light to determine a range (R) to the object 20 which caused the reflected light 104. (R)=TOF/2c=TOA−TOT/2c Since the active optical detection system 100 determines a range based on the correlation of the signal pattern of the transmitted light 102 and the reflected light 104 of the received light, instead of a pulse detection, the range detection may be more accurate. In some instances, the range detections may be as accurate as 2-10 mm of variance. The highly accurate range detection may be useful for vehicles to detect objects in blind spots, as depicted in the example of FIG. 1, or otherwise near the vehicle to reduce risks of accidents or impacts with objects. Additionally, as discussed in reference to FIGS. 6 and 7, the active optical detection system 100 may be unaffected by soft objects, such as rain, snow, fog, dust, dust, smoke, or the like, therefore allowing the active optical detection system 100 to operate in instances in which a typical active optical detection system would produce erroneous readings, or there is little to no visibility.

In an example embodiment, such as depicted in FIG. 1, the active optical detection system 100 may be deployed on the back or front of the vehicle 10. Transmitted light 102 may be transmitted in one or more transmission angles, patterns, and/or wavelengths, as discussed below in reference to FIG. 2. In an example embodiment, the active optical detection system 100 may include a plurality of light sources. Each of the respective light sources may be aligned at a different transmission angle or location and may include a unique wavelength of signal pattern. The received light may include reflected light 104 from one or more angles. The active optical detection system 100 may determine a direction of the object 20 which caused the reflected light 104 based on the transmission angle of received light which correlated to the signal pattern and/or wavelength of the transmitted light 102.

In some embodiments, a photo detector of the active optical detection system 100 may be segmented or include a plurality of photo detectors, the respective photo detectors or segments may be configured to receive light from different reception angles or locations through an aperture head. The aperture head may include a plurality of apertures aligned with the different reception angles and locations. The received light may include reflected light 104 from one or more angles. The active optical detection system 100 may determine the direction of the object 20 causing the reflected light 104 based on the segment and/or photo detector which receives the reflected light 104 which is correlated to the signal pattern indicative of the reception angle.

The active optical detection system 100 may provide the range and/or direction information separately or combined, as a proximate location, e.g. range and direction relative to the active optical detection system 100, to a user, such as a driver. In the depicted example, the active optical detection system 100 may provide the range, direction, and or proximate location of one or both of the objects 20, e.g. cars, in the vehicle 10 blind spot to the driver of the vehicle 10.

In an instance in which the active optical detection system 100 determines a plurality of correlations between the received light and the signal pattern a velocity or relative velocity may be determined for the object 20. For example, in some instances the active optical detection system 100 may transmit light in a signal pattern, at a predetermined interval, randomly, or continuously to detect a change in location or distance of the object 20. The change in the location or distance of the object 20 divided by the change in time is the relative velocity (RV) of the object 20 (ΔR/ΔT=R1−R2/T1−T2=RV). The actual velocity (AV) of the object 20 may be determined by adding the relative velocity of the object 20 to the velocity of the active optical detection system 100 (Vods). RV+Vods=AV Although, the depicted example includes the active optical detection system 100 being deployed on a tractor trailer, the optical detection system 100 may be deployed on other types of vehicles such as bikes, motor cycles, cars, all-terrain vehicles, planes, boats, missiles, or the like. Additionally or alternatively, the active optical detection system 100 may be deployed on or in a building and monitor for objects, e.g. a person, animal, or the like, proximate to a window, doorway, hallway, room, yard, or the like.

Example Optical Transmitter

Figure 2:
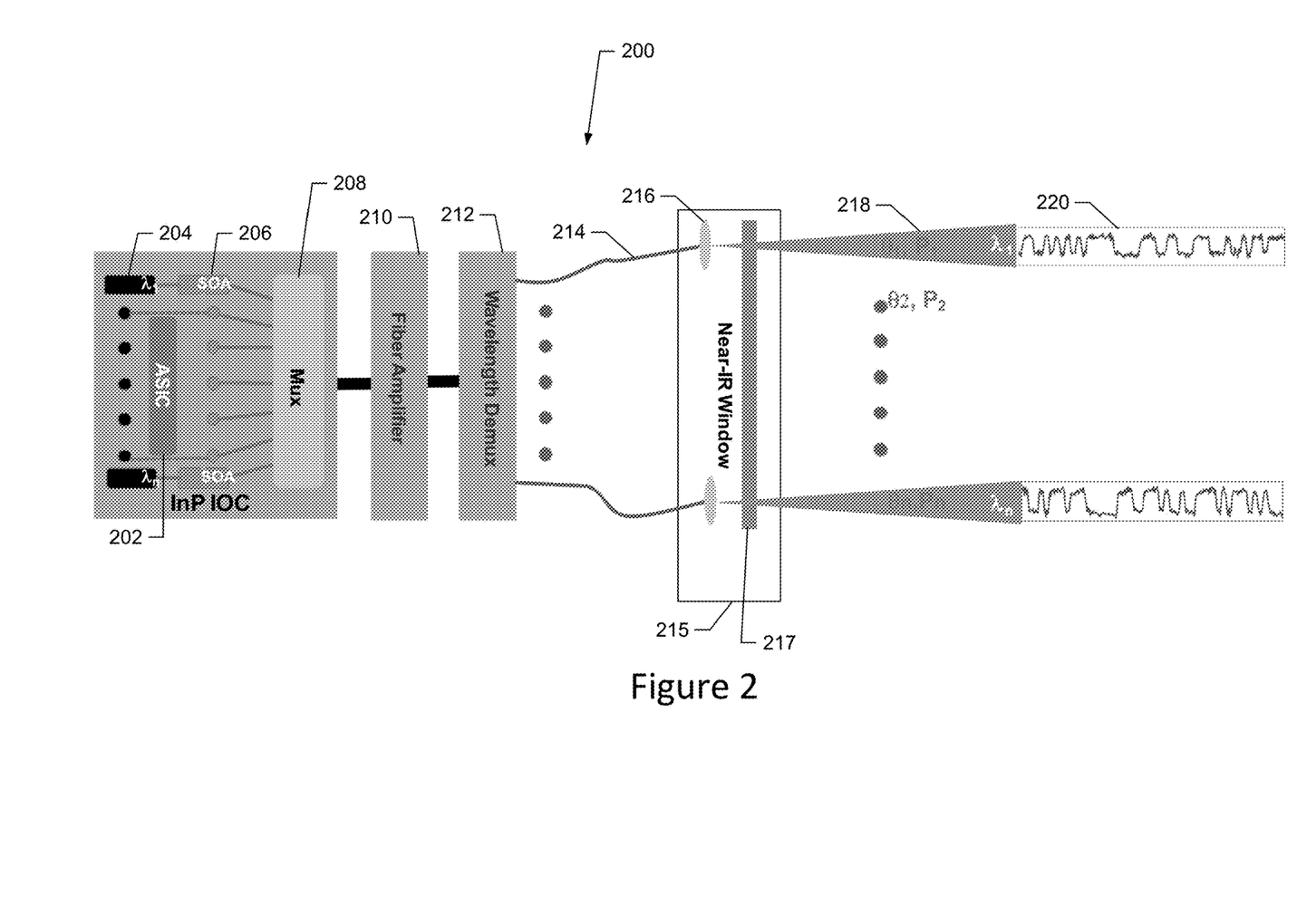
FIG. 2 illustrates an optical transmitter according to an example embodiment.

FIG. 2 illustrates an optical transmitter according to an example embodiment. The optical transmitter 200 may include a signal generator 202 and a light source 204.

The light source 204 may be a light emitting diode, laser, or other electronically controlled light source. In an example embodiment, the light source 204 may be incorporated into one or more vehicle systems, such as headlights. In an instance in which the light source 204 is incorporated into the vehicle system the modulation of the signal pattern 220 may be at a frequency above the visible range for humans.

The signal generator 202 may include an ASIC (application-specific integrated circuit), or other processing circuitry configured to generate a signal pattern 220 and cause modulation of the light source 204 based on the signal pattern 220, such as processing circuitry 50, as discussed below in reference to FIG. 8. In some instances, the signal pattern 220 may be a random pattern, or a pseudo-random bit pattern, or the like. In an example embodiment, a pseudo-random-bit-pattern repeats itself every $2^N$ bits with (N>12). In an example embodiment, the signal generator 202 may be operably coupled to and directly modulate the light source 204, such as via an analog to digital converter, varying the voltage applied to an LED. Additionally or alternatively, the signal generator 202 may modulate the output of the light source 204, such as by applying optical amplification. In an example embodiment, optical amplification may be provided by a spectrum optical amplifier 206, which is operably coupled to and controlled by the signal generator 202. The optical receiver 200 may transmit the transmitted light 218 modulated in the signal pattern 220.

In an example embodiment, the optical receiver 200 may include a plurality of light sources 204. The light sources 204 may have a unique wavelength. For example, the light sources could include a plurality of lasers. In this regard, for example, a first laser may be a 0.633 μm HeNe laser, a second laser may be a 0.405 μm diode laser, a third laser may be a 1.064 μm YAG laser, a fourth laser may be a 3.390 μm HeNe laser, and a fifth laser may be a 10.6 μm $CO_2$ laser. In an example embodiment in which the light source 204 includes a plurality of light sources, the respective light sources 204 may have different modulated signal patterns 220.

In some embodiments, each of the light sources 204 may be modulated by a respective spectrum optical amplifier 206. Power requirements and/or space requirements may be relatively small in an embodiment in which the light from the light source 204 is amplified after modulation. Modulation of the light sources 204 may allow for low power light lasers and LEDs to be utilized which are safe to human eyes. In an example embodiment, an LED may emit 10W of modulated light.

In some example embodiments, the light from the light source 204 may be amplified prior to transmission. In an example embodiment, the light source or light sources 204 may be amplified by an optical amplifier, such as a fiber amplifier 210, with a gain of about 30-50 nm.

Additionally or alternatively, the light from the light sources 204 may be multiplexed prior to amplification by the fiber amplifier 210. A multiplexor 208 may be operably coupled between the plurality of light sources 204 and the optical amplifier 210. In some embodiments, the multiplexor 208 may be operably coupled to the plurality of spectrum optical amplifiers 206. The multiplexor 208 may receive a plurality of modulated light signals from the light sources 204 or spectrum optical amplifiers 206. The modulated light signals may be multiplexed for communication to the optical amplifier 210 in a single communication path. The amplified multiplexed light signal may be received by a demultiplexor 212, which is operably coupled to an output of the optical amplifier 210. The demultiplexor 212 may separate the light signals for transmission. Amplification of the multiplexed light signals instead of individual amplification may reduce the weight, cost, number of components, size and/or power consumption of the optical transmitter 200.

In an example embodiment, the light signals are transmitted from the optical transmitter 200 through an optical head 215. The optical head 215 may be operably coupled to the light sources 204 by an optical fiber 214. The optical head 215 may include a lens 216 for each of the light sources 204. The lens 204 may focus the transmitted light 218 at a specified angle θ. In an example embodiment, the transmitted light 218 may be focused at a different transmission angles θ, be modulated in a different signal pattern P 220, and/or have a different wavelength λ. In an example embodiment, the transmitted light 218 may be transmitted at differing locations, such proximate to a front door, a back door, a hallway, or the like. The transmission angle, wavelength and/or location of transmission of the transmitted light 218 may be provided to an optical receiver, such as optical receiver 300 discussed below in reference to FIG. 3, for determination of an object direction or location.

In some example embodiments, the optical head 215 may include a near-IR window 217 or near-IR or visible filter, disposed after the lens 216 in the transmission path of the transmitted light 218. The near IR window 217 may reduce or inhibit transmitted light 218 which is outside of the desired spectrum.

Example Optical Receiver

Figure 3:
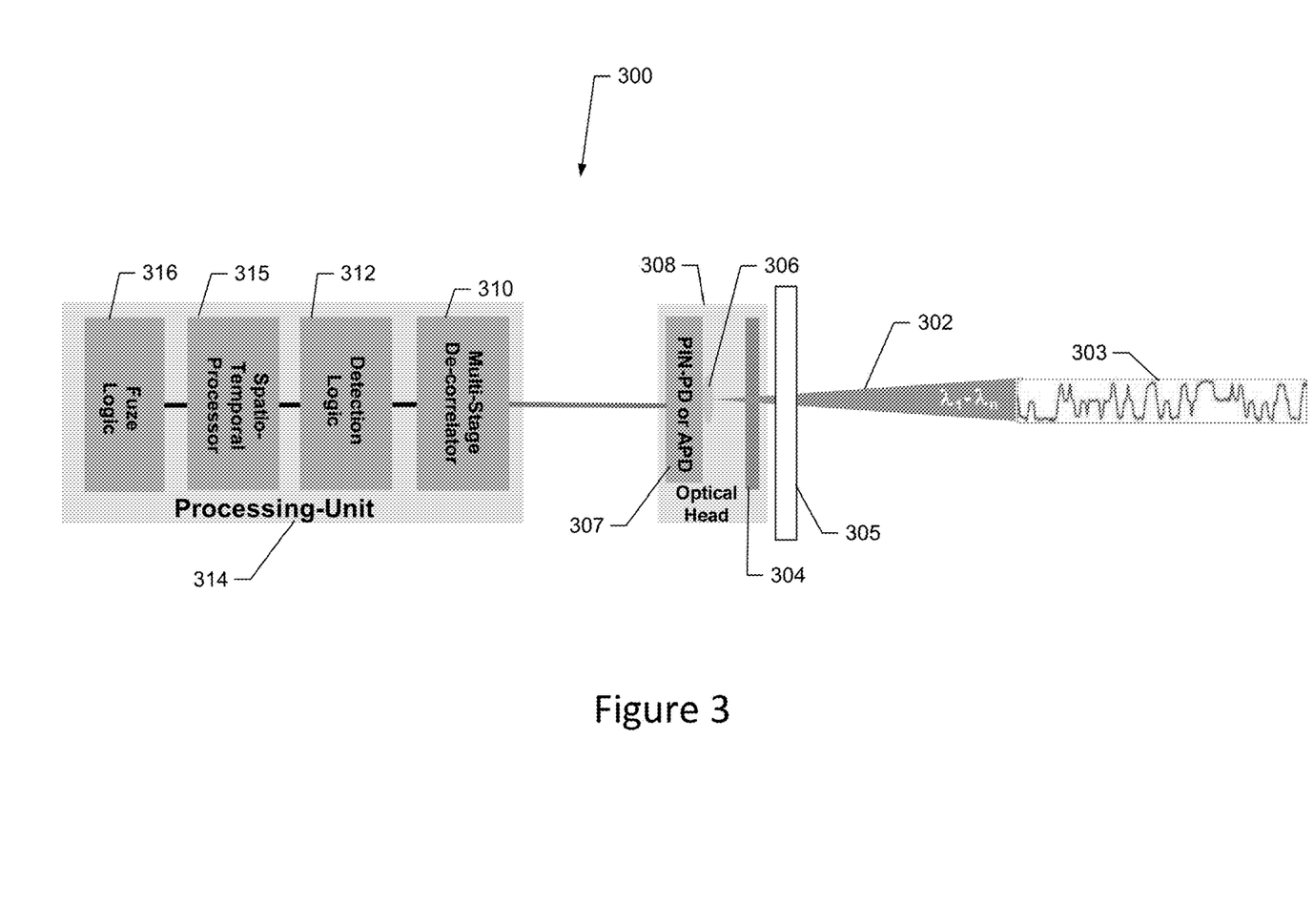
FIG. 3 illustrates an optical receiver according to an example embodiment.

FIG. 3 illustrates an optical receiver 300 according to an example embodiment. The optical receiver 300 may include a photo detector 307 and processing circuitry 314. The photo detector 307 may be a PIN Photo diode (PIN PD), an avalanche photodiode (APD), or the like. The photo detector 307 may receive light 302, which may include reflected light 104. In an example embodiment, the received light 302 may be a time and wavelength multiplexed return signal.

The photo detector 307 may be disposed within an optical head 308, which may also include an optical filter 304 and a lens 306. The optical filter 304 may filter the received light 302. The optical filter 304 may be configured to pass light at the wavelength at or near the wavelength of the transmitted light 218, and inhibit light of wavelengths different from the light source from being received by the photo detector 307.

The lens 306 may focus the received light 302 on the photo detector 307. The photo detector 307 may be operably coupled to the processing circuitry 314. The photo detector 307 may provide light data to the processing circuitry 314 for correlation analysis.

The processing circuitry 314 may determine correlations between the received light 302 and the signal pattern 220. The correlations may be a match or partial match of a signal pattern 303 in the received light 302 with the signal pattern 220 of the transmitted light 218. The received light 302 may include reflected light 104 and background light. The reflected light 104 may be reflections from soft objects, such as smoke, dust, rain, fog, or the like, or a hard target, such as a vehicle. In an instance in which the reflected light 104 is from a soft target, the received light 302 signal pattern 332 may be a partial match to the signal pattern 220. Similarly, background light may have instances which include partial matches. The reflected light 104 from hard objects may include complete or near complete signal patterns 303 matching the signal pattern 220 of the transmitted light 218.

The light data may be received by a multi stage de-correlator 310 of the processing circuitry 314. The multi stage de-correlator 310 may determine correlation values, such as signal pattern match scores in percent, for the signal patterns 303 in the received light 302. In an example embodiment, each signal pattern 303 may be compared to the signal pattern 220 of the transmitted light 218. In some example embodiments, the multi stage de-correlator 310 separate, e.g. de-multiplex, the signal patterns 303 based on time, wavelength, or the like, for correlation analysis. Each signal pattern 303 of the received light 302 may be individually analyzed for correlation with the signal pattern 220 of the transmitted light 218. The signal patterns 303 may be assigned a correlation value, such a 5 percent, 38 percent, 79 percent, 98 percent, or the like, based on the amount. In some embodiments, the multi stage de-correlator 310 may also assign a TOA value to the received light 302. The multi stage de-correlator 310 may provide the correlation values, and/or TOA data to detection logic 312 of the processing circuitry 314.

The detection logic 312 may determine a correlation, e.g. hit, based on the correlation values. In an example embodiment, the detection logic 312 may compare the correlation values to a predetermined correlation threshold, such as 60 percent, 75 percent, 85 percent, or the like. A correlation may be determined in an instance in which the correlation value satisfies the predetermined correlation threshold, for example, a correlation value of 89% would satisfy a correlation value threshold of 75% and be determined a correlation, e.g. a "hit". In an instance in which the correlation value fails to satisfy the predetermined correlation threshold, the associated signal pattern 303 would not be considered a correlation. The detection logic 312 may provide correlation data to a spatial-temporal processor 315.

The spatial-temporal processor 315 may determine the range to the object 20. The spatial-temporal processor 315 may receive a TOT for the correlation data from the optical transmitter 200. Additionally or alternatively, the optical receiver 300 may be synchronized with the optical transmitter 200, such that that the TOT may be determined by the spatial-temporal processor 315. The TOA of the correlated data may be received from the detection logic 312, or multi-stage de-correlator 310. The spatial-temporal processor 315 may determine the range to the object by dividing the difference in the TOA and TOT, e.g. TOF, by 2 and the speed of light. $(R)=TOF/2c=TOA-TOT/2c$. In an example embodiment, the optical receiver 200 may be capable of determining a range to an object 20 in excess of 50 m. In some example embodiments, the optical receiver 300 may have a detection time of less than 500 μs and an accuracy of <2 cm.

In an instance in which the detection logic 312 determines a plurality of correlations between the received light 302 signal pattern 303 and the signal pattern 200 of the transmitted light 218, a velocity or relative velocity may be determined for the object 20. The relative velocity of the object 20 may be determined, by the spatial-temporal processor 315, by determining a change in the location or distance of the object 20 divided by the change in time between the correlations may be the relative velocity (RV) of the object 20. $\Delta R/\Delta T=R1-R2/T1-T2=RV$ The actual velocity (AV) of the object 20 may be determined by adding the relative velocity of the object 20 to the velocity of the optical receiver 300. (Vods). RV+Vods=AV In an example embodiment, the spatial-temporal processor 315 may determine a direction or location of the object 20. In an example embodiment, the correlation data may also include a wavelength, signal pattern, or signal pattern identifier, of the correlated received light 302. As discussed above, the transmitted light 318 may be transmitted in a plurality of transmission angles, and each transmission angle may have a unique wavelength, and/or signal pattern. The transmission angle associated with the transmitted light 318 wavelengths, and/or signal patterns may be received by the processing circuitry 314, such as by the multi stage decorrelator 310 or spatial-temporal processor 315. The correlation value may also include the angle information associated with the wavelength or signal pattern or the received light 303. The spatial-temporal correlator 315 may associate the angle of the transmitted light 218 to the correlated signal pattern 303. In an instance in which the optical transmitter 200 is housed in association with the optical receiver 300, the transmitted angle may be determined to be the direction of the object 20. In an example embodiment in which the optical transmitter 200 is housed separately from the optical receiver 300, a difference in orientation may be determined and supplied to the processing circuitry 314, such as to the spatial-temporal processor 315. The spatial-temporal processor 315 may apply the difference in orientation to the transmission angle to determine the direction of the object 20. In an example embodiment, a location of the transmission may be provided in addition or alternatively to the angle information. The location information may identify a reference transmission point, such as a doorway, hallway, or the like for the transmitted light 218.

Additionally or alternatively, the optical head 308 may be an aperture head 305. The aperture head 305 may include a plurality of apertures aligned to different reception angles. The photo detector 307 may include a plurality of photo detector segments or may be a plurality of photo detectors. Each of the respective apertures may be aligned with a segment of the photo detector 307 or a photo detector of the plurality of photo detectors 307. The direction of the object 20 may be determined by the reception angle of the aperture associated with the segment of the photo detector or photo detector of the plurality of photo detectors which detected the received light 318.

In an example embodiment, the range of the object 20 and direction of the object 20 may be associated to provide a relative location of the object 20 in relation to the optical receiver 300. The range to the object 20, direction of the object 20, velocity of the object 20, relative location of the object 20, or the like, may be provided to an output 316, such as a user interface, providing proximity data to a user, or to a trigger, such as a security system, missile fuse, or the like. In the depicted embodiment, the output 316 is a fuse logic, which may trigger a detonation upon the range, velocity, direction, or location of the object 20 satisfying a predetermined trigger. Additionally or alternatively, the relative location of the object 20 may be used for three dimensional optical imaging.

Figure 4:
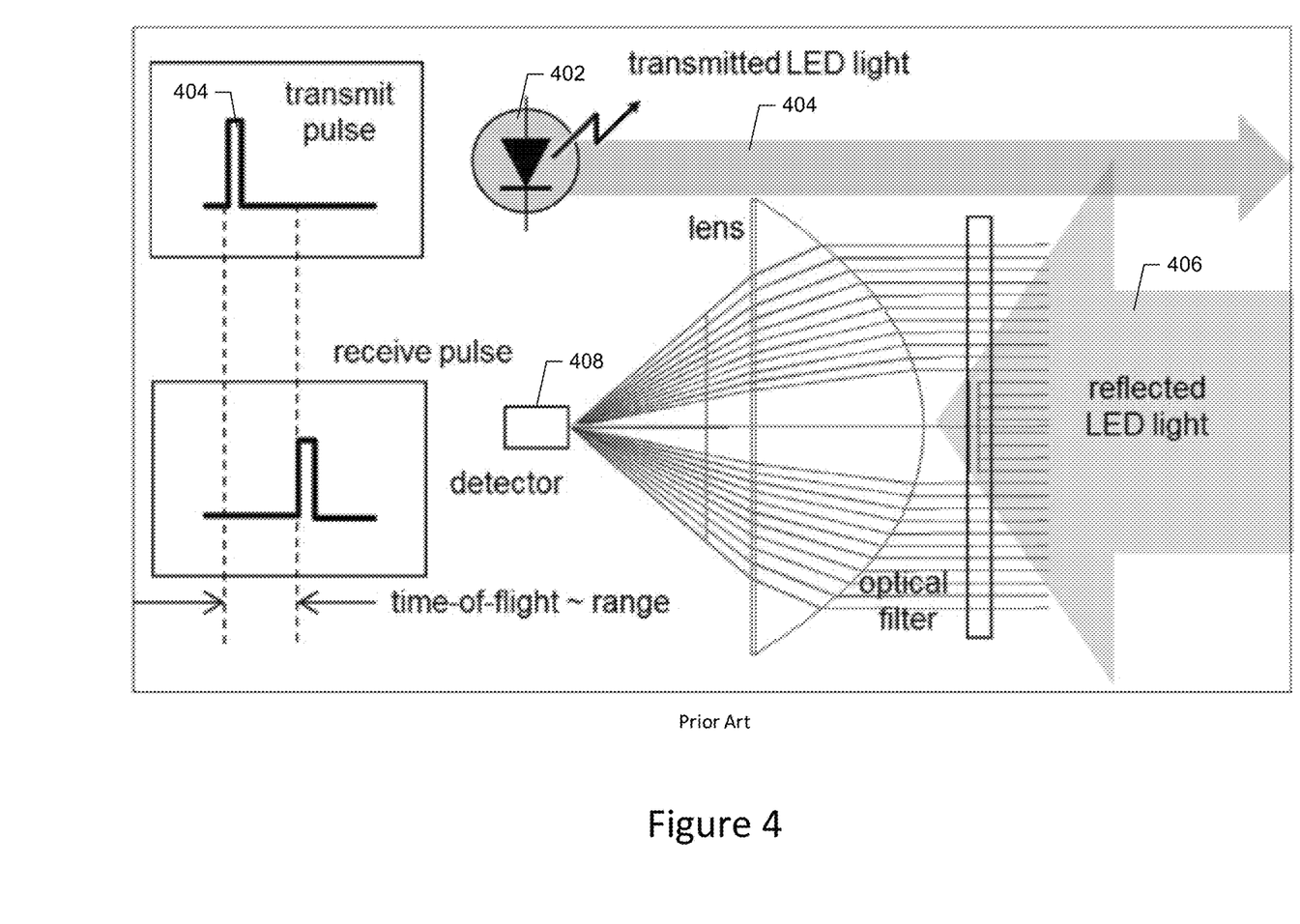
FIG. 4 illustrates range determination by a typical active optical detection system.

FIG. 4 illustrates range determination by a typical active optical detection system. An LED 402 or other light source may transmit a light pulse 404. The light pulse 404 may be reflected off an object 20 causing reflected light 406 to return to the optical detector 408. The optical detector 408 may determine the TOF of the light pulse 404. The optical detector 408 may then determine a range to the object 20 based on the TOF, as discussed above in reference to FIG. 3.

Figure 5:
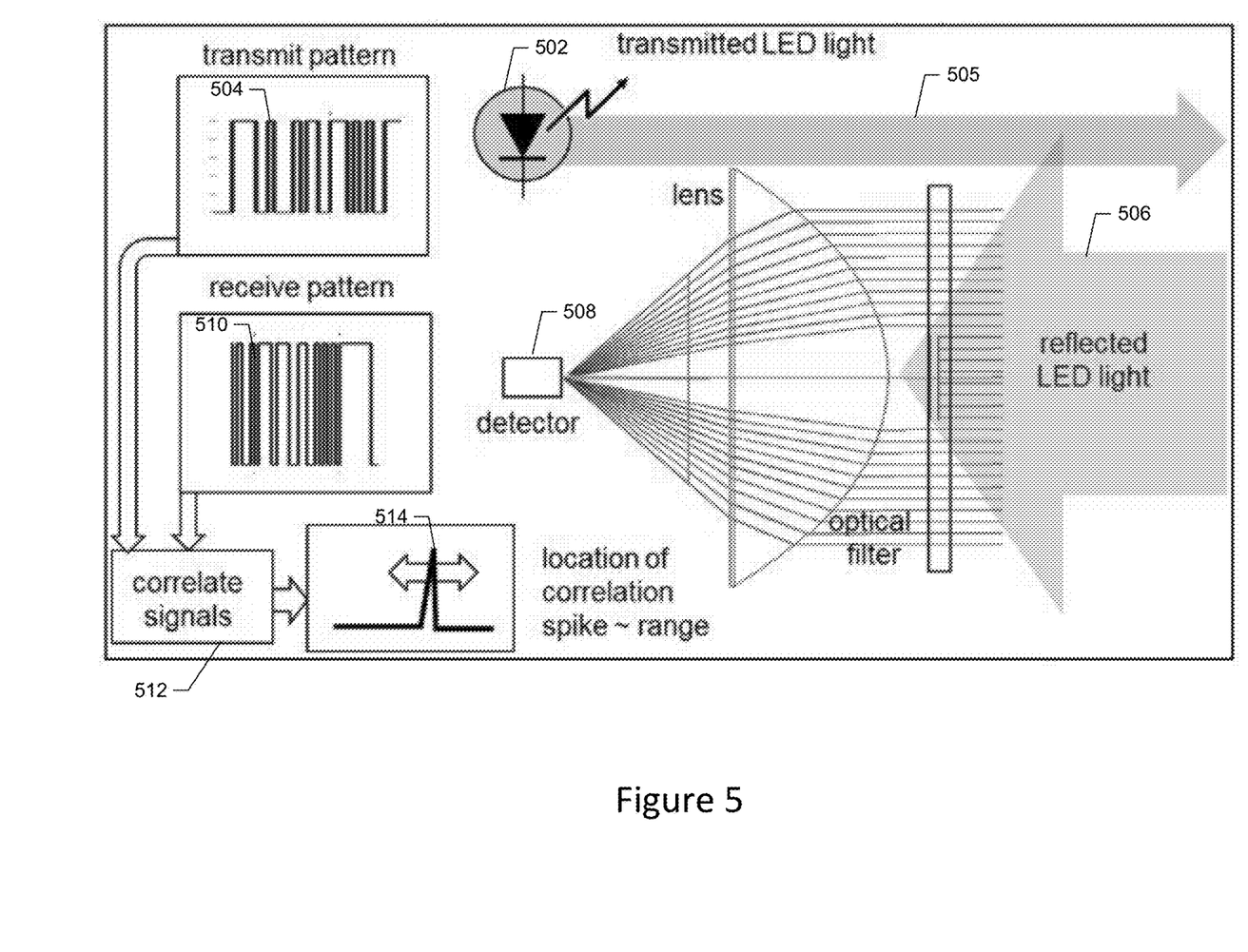
FIG. 5 illustrates a correlation determination according to an example embodiment.

FIG. 5 illustrates a correlation determination according to an example embodiment. A light source 502, such as an LED, may transmit light as transmitted light 505 including a signal pattern 504. The transmitted light 505 may be reflected off object 20 causing reflected light. The received light 506 may be received by the optical detector 508, such as photo detector 307. The received light 506 may include the reflected light from object 20. A signal pattern 510 may be detected in the received light and compared to the signal pattern 504, such as by the processing circuitry 314. In an instance in which the signal pattern 504 of the transmitted light 505 and signal pattern 510 in the received light 506 match or nearly match, the match may be denoted by a correlation spike 514 associated with the reflected light off an object 20 in the received light 506.

Figure 6:
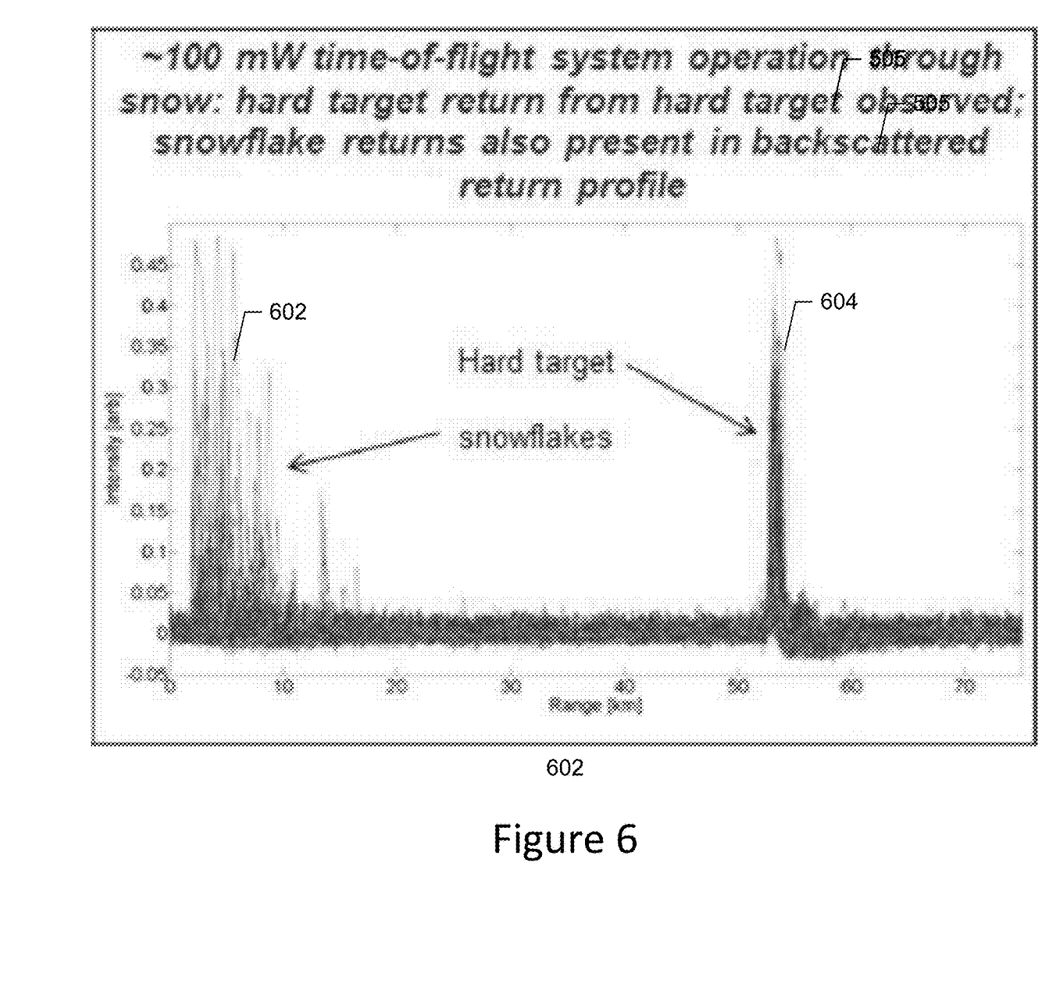
FIG. 6 illustrates optical detection ranging results of a typical active optical detection system.

FIG. 6 illustrates active optical detection ranging results of a typical active optical detection system. As discussed above, in reference to FIG. 4, typical active optical detection utilizes light pulses. The light pulses may be reflected by the hard object, e.g. target, and soft objects, such as snow. As depicted, a ~100 mW laser time-of-flight system is operating in snow. The active optical detection system range profile returns an observation of detection of the hard target 604 as approximately 54 km. However, the optical detector also returns significant backscatter 602 in the range profile from 1-20 km. The backscatter can occlude or confuse ranging results.

Figure 7:
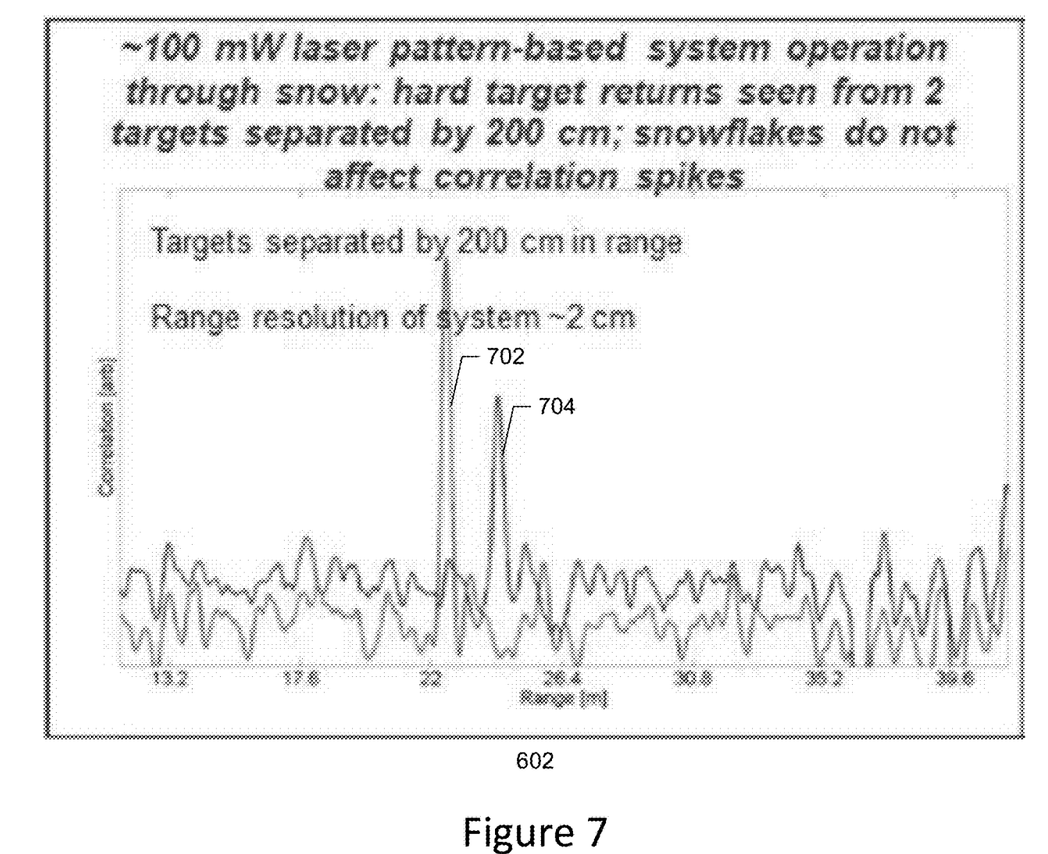
FIG. 7 illustrates correlation determination ranging results according to an example embodiment.

FIG. 7 illustrates a correlation determination ranging results according to an example embodiment. A ~100 mW laser pattern-based active optical detection system, similar to active optical detection system 100, is operated in snow. Two hard targets are placed in a detection field separated by 200 cm in range. A first acquisition correlation spike 702 is determined at approximately 22 m and a second acquisition correlation spike 704 is determined at approximately 24 m. Partial correlations in the received light are determined in other areas, but no correlation spikes are produced by soft objects, e.g. snow. In the depicted example, the range resolution of the system is approximately 2 cm.

Example Active Optical Detection System

Figure 8:
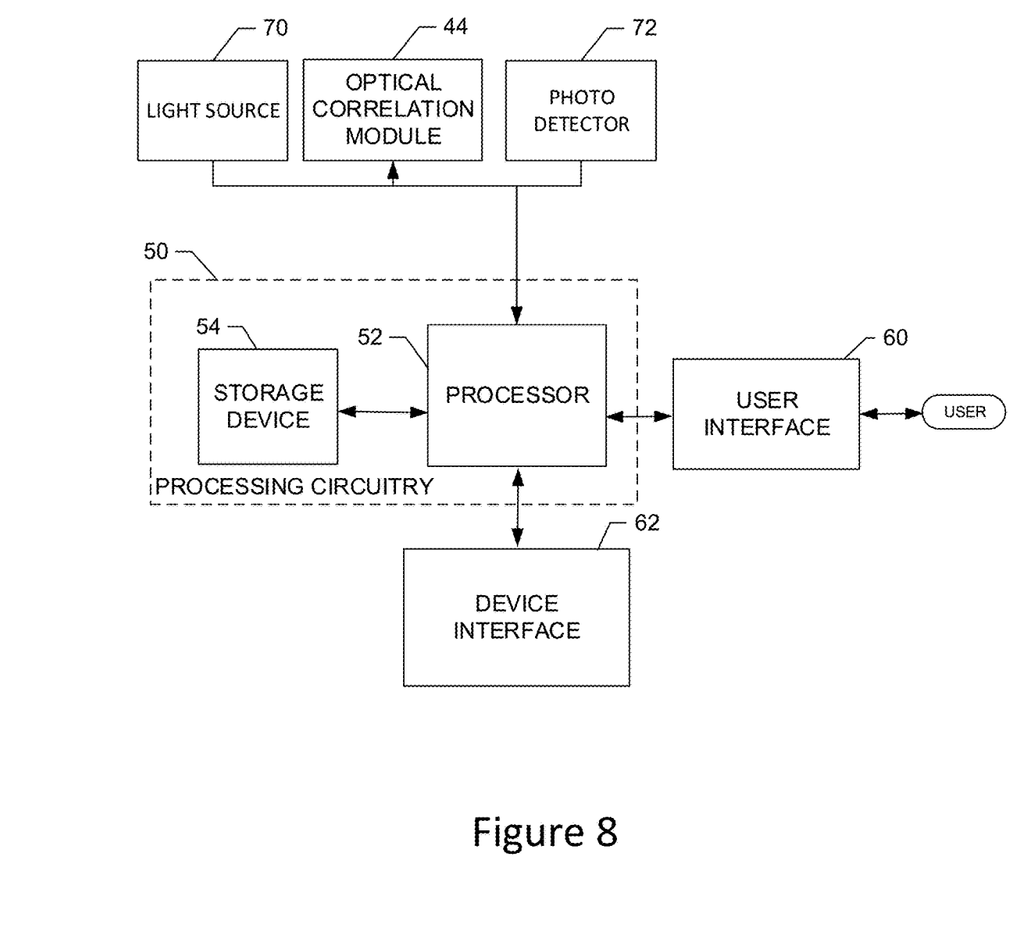
FIG. 8 illustrates a functional block diagram of an active optical detection system that may be useful for determining a correlation between received light and a signal pattern according to an example embodiment.

FIG. 8 shows certain elements of an active optical detection system according to an example embodiment. The active optical detection system 100 may be embodied in a single unit or multiple units, such as an optical transmitter 200 and an optical receiver 300. Furthermore, it should be noted that the devices or elements described below may not be mandatory and thus some may be omitted in certain embodiments.

In an example embodiment, the active optical detection system 100 may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60, a device interface 62, a light source 70, and a photo detector 72. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device) that may be in communication with the processing circuitry 50 via the device interface 62 and/or a network.

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

The light source 70 may be an LED, a laser, or other light emitting device. In some example embodiments, the light source 70 may be a plurality of light sources. The processing circuitry 50 may cause the light source 70 to transmit light in a specific signal pattern, as discussed above in reference to FIG. 2. In that regard, in an example embodiment, the light source 70 may be embodied as light source 204, as discussed in reference to FIG. 2.

The photo detector 72 may be a PIN Photo diode (PIN PD), an avalanche photodiode (APD), or the like. The photo detector 72 may receive light, such as reflected light associated with the transmitted light, as discussed above in reference to FIG. 3. In that regard, in an example embodiment, the photo detector 72 may be embodied as photo detector 307, as discussed in reference to FIG. 3.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the optical correlation module 44, which may be any means, such as, a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the optical correlation module 44 as described below.

The optical correlation module 44 manager may include tools for optical proximity detection. In an example embodiment, the optical correlation module 44 may be configured for transmitting light in a signal pattern, receiving light at an active optical detection system, determining a correlation between the received light and the signal pattern, and determining, by the optical detection system, a range to an object based on the correlation between the received light and the signal pattern.

Example Optical Detection Flow Chart

Figure 9:
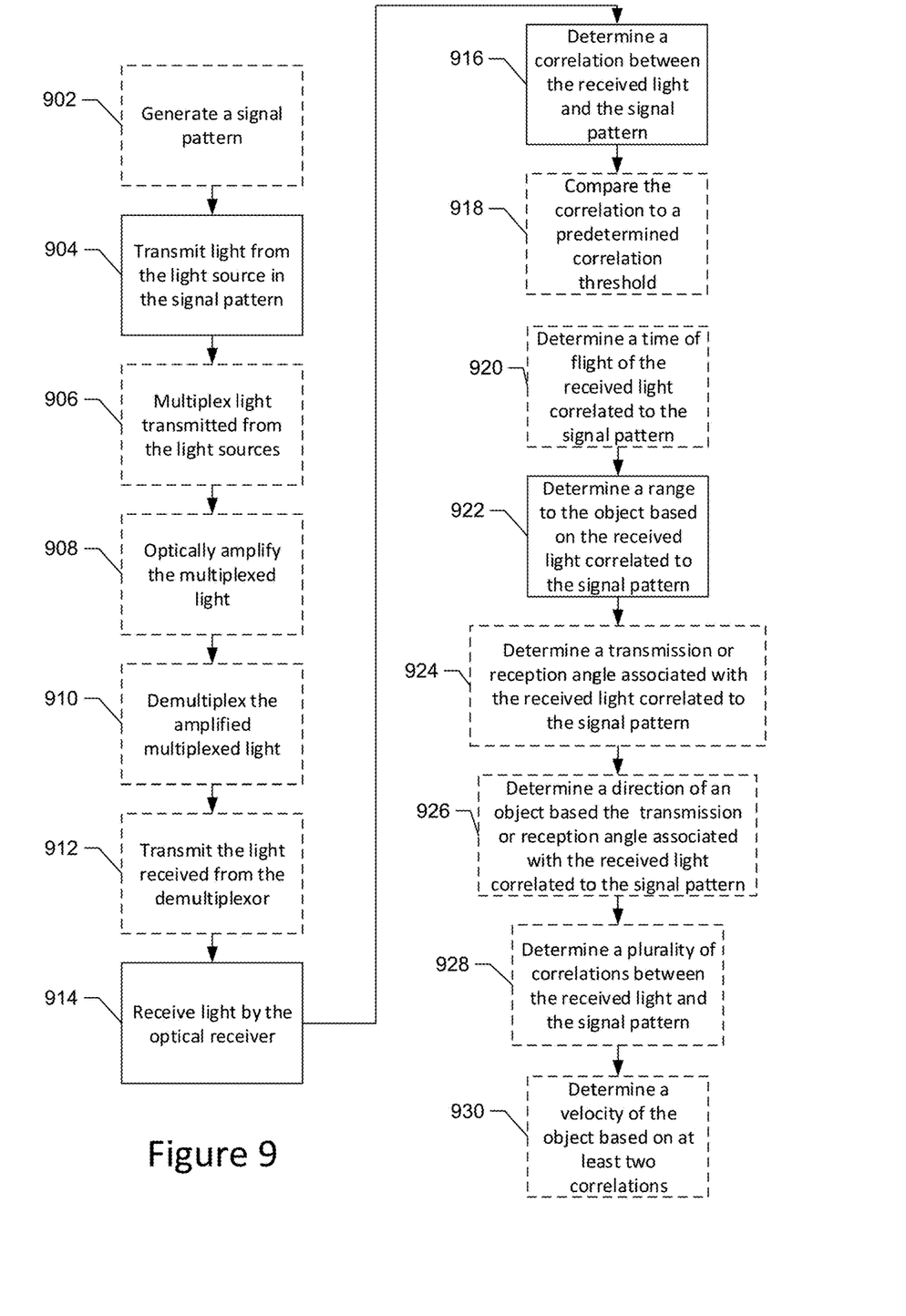
FIG. 9 illustrates a method for range determination of an object based on a correlation between received light and a signal pattern according to an example embodiment.

From a technical perspective, the optical correlation module 44 described above may be used to support some or all of the operations described above. As such, the active optical detection system described in FIG. 8 may be used to facilitate the implementation of several computer program and/or network communication based interactions. As an example, FIG. 9 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention is shown in FIG. 9. The method may be employed for a multi-step selection interface. The method may include, transmitting light from a light source in a signal pattern, at operation 904, and receiving light by the optical receiver, at operation 914. At operation 916, the method also includes determining a correlation between the received light and the signal pattern, and determining a range to the object based on the received light correlated to the signal pattern at operation 922.

In an example embodiment, the method may optionally include, as denoted by the dashed box, generating a signal pattern, at operation 902. The method may also include, multiplexing light transmitted from the light sources at operation 906, optically amplifying the multiplexed light at operation 908, and demultiplexing the amplified multiplexed light at operation 910. At operation 912, the method may also include transmitting the light received from the multiplexor. The method may include, at operation 918, comparing the correlation to a predetermined correlation threshold, at operation 920, determining a time of flight of the received light correlated to the signal pattern. At operation 924, the method may further include, determining a transmission or angle associated with the received light correlated with to the signal pattern, at operation 926, determining a direction of an object based on the transmission or reception angle associated with the received light correlated with to the signal pattern. The method may additionally include, at operation 928, determining a plurality of correlations between the received light and the signal pattern, and at operation 930, determining a velocity of the object based on at least two correlations.

In an example embodiment, an apparatus for performing the method of FIG. 9 above may comprise a processor (e.g., the processor 52) or processing circuitry configured to perform some or each of the operations (902-930) described above. The processor may, for example, be configured to perform the operations (902-930) by performing hardware implemented logical functions, executing stored instructions, or executing algorithms for performing each of the operations. In some embodiments, the processor or processing circuitry may be further configured for additional operations or optional modifications to operations 902-930. In this regard, in an example embodiment, the optical receiver includes a photo detector configured to detect the received light and processing circuitry configured for the determination of the correlation between the received light and the signal pattern. In some example embodiments, the processing circuitry is further configured to determine a transmission angle of the transmitted light. In an example embodiment, the processing circuitry is further configured to determine a direction of the object based on the transmission angle of the transmitted light. In some example embodiments, the processing circuitry is further configured determine a direction of the object based on a segment of the photo detector or a photo detector of a plurality of photo detectors which received the received light correlated to the signal pattern. The segment of the photo detector or the photo detector of a plurality of photo detectors which received the received light correlated to the signal pattern is indicative of a reception angle. In an example embodiment, the processing circuitry is further configured to determine a plurality of correlations between the received light and the signal pattern and determine a velocity of the object based on at least two correlations. In some example embodiments, the processing circuitry also includes detection logic configured to compare the correlation of the received light and the signal pattern to a predetermined correlation threshold. The processing circuitry determination of the range or the direction of the object is based on correlations which satisfy the correlation threshold. In an example embodiment, the signal pattern is a pseudo-random bit pattern. In some example embodiments, the optical transmitter includes a signal generator to generate the signal pattern and a light source operably coupled to the signal generator configured to transmit the light in the signal pattern. In an example embodiment, the light source includes a plurality of light sources. The signal generator is further configured to generate a unique signal pattern for each light source of the plurality of light sources. In some example embodiments, the light source is at least one laser. In an example embodiment, the at least one laser comprises a plurality of lasers and the respective lasers of the plurality of lasers transmit light at unique wavelengths. In some example embodiments, the light source is at least one light emitting diode. In an example embodiment, the optical transmitter also includes an optical amplifier to amplify the transmitted light from the light source prior to transmitting the transmitted light. In some example embodiments, the light source includes a plurality of light sources. The optical transmitter also includes a multiplexor operably coupled between the plurality of light sources and the optical amplifier to transmit the modulated light signals from the plurality of light sources to the optical amplifier in a single light signal; and a demultiplexor operably coupled to the optical amplifier to separate the amplified light signals before emitting the light. In an example embodiment, the optical receiver also includes an optical filter to inhibit light of wavelengths different than the light source from being received by the photo detector.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring devices are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:
1. An active optical detection system comprising:
   a signal generator configured to generate a plurality of signal patterns, each signal pattern comprising a unique transmit bit pattern;
   an optical transmitter comprising a plurality of light sources, each light source being aligned to a different transmission angle, wherein the optical transmitter is configured to transmit light from each light source in accordance with one of the signal patterns of the plurality of signal patterns;
   an optical receiver configured to receive light as a receive bit pattern; and
   processing circuitry configured to:
      determine a correlation between the receive bit pattern and one of the unique transmit bit patterns of the plurality of signal patterns, wherein the correlation between the receive bit pattern and the one of the unique transmit bit patterns determines a correlation spike that is indicative of a range to an object; and determine a direction to the object based on the correlation and the transmission angle associated with the signal pattern for the one of the unique transmit bit patterns.

2. The active optical detection system of claim 1, wherein the optical receiver comprises a photo detector configured to detect light associated with the receive bit pattern.

3. The active optical detection system of claim 2, wherein the processing circuitry is further configured determine a direction of the object based on a segment of the photo detector which received the light associated with the receive bit pattern or the photo detector being one of a plurality of photo detectors which received the light associated with the receive bit pattern, wherein the segment of the photo detector or the photo detector being one of a plurality of photo detectors which received the received the light associated with the receive bit pattern is indicative of a reception angle.

4. The active optical detection system of claim 1, wherein the processing circuitry is further configured to determine a plurality of correlations between the receive bit pattern and the one of the unique transmit bit patterns of the plurality of signal patterns and determine a velocity of the object based on at least two correlations.

5. The active optical detection system of claim 1, wherein the processing circuitry further comprises detection logic configured to compare the correlation of the receive bit pattern and the one of the unique transmit bit patterns of the plurality of signal patterns to a predetermined correlation threshold, wherein the processing circuitry determination of the range of the object is based on the correlation satisfying the correlation threshold.

6. The active optical detection system of claim 1, wherein each signal pattern comprises a pseudo-random bit pattern.

7. The active optical detection system of claim 1, wherein the plurality of light sources comprises a plurality of lasers.

8. The active optical detection system of claim 7, wherein each laser of the plurality of lasers transmits light at a different wavelength.

9. The active optical detection source of claim 1, wherein the plurality of light sources comprises at least one light emitting diode.

10. The active optical detection system of claim 1, wherein the optical transmitter further comprises an optical amplifier to amplify transmitted by the plurality of light sources.

11. The active optical detection system of claim 10, wherein the optical transmitter further comprises:
a multiplexor operably coupled to the optical amplifier to transmit modulated light signals to the optical amplifier as a single light signal; and
a demultiplexor operably coupled to the optical amplifier to separate amplified modulated light signals for transmission.

12. The active optical detection system of claim 1, wherein the optical receiver further comprises an optical filter to inhibit receipt of light of wavelengths different than wavelengths output by the plurality of light sources.

13. The active optical detection system of claim 1, wherein the optical transmitter is configured to transmit light from each light source at a different wavelength.

14. A method comprising:
generating a plurality of signal patterns, each signal pattern comprising a unique transmit bit pattern;
transmitting light via a plurality of light sources, each light source being aligned to a different transmission angle and each light source transmitting one of the plurality of signal patterns;
receiving the light at an active optical detection system as a receive bit pattern;
determining a correlation between the receive bit pattern and one of the unique transmit bit patterns of the plurality of signal patterns;
determining, by the active optical detection system, a range to an object based on a correlation spike determined from the correlation between the receive bit pattern and the one of the unique transmit bit patterns; and
determine a direction to the object based on the correlation and the transmission angle associated with the signal pattern for the one of the unique transmit bit patterns.

15. The method of claim 14 further comprising determining the direction of the object based on a reception angle.

16. The method of claim 15 further comprising comparing the correlation between the receive bit pattern and the one of the unique transmit bit patterns of the plurality of signal patterns to a predetermined correlation threshold, wherein the determination of the range or the direction of the object is based on the correlations satisfying the correlation threshold.

17. The method of claim 14, further comprising:
determining a plurality of correlations between the receive bit pattern and the one of the unique transmit bit patterns of the plurality of signal patterns; and
determining a velocity of the object based on at least two correlations.

* * * * *